US009286495B2

(12) United States Patent
Sadr

(10) Patent No.: US 9,286,495 B2
(45) Date of Patent: Mar. 15, 2016

(54) SYSTEMS AND METHODS FOR ESTIMATION OF A POPULATION OF PASSIVE RFID SENSORS

(71) Applicant: Mojix, Inc., Los Angeles, CA (US)

(72) Inventor: Ramin Sadr, Los Angeles, CA (US)

(73) Assignee: Mojix, Inc., Los Angeles, CA (US)

( * ) Notice: Subject to any disclaimer, the term of this patent is extended or adjusted under 35 U.S.C. 154(b) by 43 days.

(21) Appl. No.: 14/205,279

(22) Filed: Mar. 11, 2014

(65) Prior Publication Data

US 2014/0253293 A1    Sep. 11, 2014

Related U.S. Application Data

(60) Provisional application No. 61/776,683, filed on Mar. 11, 2013.

(51) Int. Cl.
*G06K 7/10* (2006.01)
*G06K 17/00* (2006.01)
(52) U.S. Cl.
CPC ........ *G06K 7/10009* (2013.01); *G06K 7/10029* (2013.01); *G06K 2017/0051* (2013.01)
(58) Field of Classification Search
CPC .................. G06K 7/10009; G06K 2017/0051; G06K 7/10029
USPC .......................... 340/10.1, 10.2; 370/229–240
See application file for complete search history.

(56) References Cited

U.S. PATENT DOCUMENTS

| 2003/0214389 | A1* | 11/2003 | Arneson ................ G06Q 10/08 340/10.1 |
| 2006/0170534 | A1 | 8/2006 | Arneson et al. |
| 2007/0096877 | A1 | 5/2007 | Quan et al. |
| 2007/0126555 | A1* | 6/2007 | Bandy .................. G06K 7/0008 340/10.2 |
| 2008/0074238 | A1 | 3/2008 | Kodialam et al. |
| 2008/0150674 | A1 | 6/2008 | Park et al. |
| 2009/0134975 | A1 | 5/2009 | Eom et al. |
| 2010/0039228 | A1* | 2/2010 | Sadr ......................... G01S 5/12 340/10.1 |
| 2013/0222118 | A1* | 8/2013 | Felemban ................ G06K 7/01 340/10.2 |

FOREIGN PATENT DOCUMENTS

WO    2014164919 A1    10/2014

OTHER PUBLICATIONS

International Search Report and Written Opinion for International Application PCT/US2014/023797, report completed Jun. 9, 2014, mailed Jul. 21, 2014, 6 pages.

(Continued)

*Primary Examiner* — Jennifer Mehmood
*Assistant Examiner* — Oscar Casillashernandez
(74) *Attorney, Agent, or Firm* — KPPB LLP

(57) ABSTRACT

Systems and methods for providing an estimate of a population of passive Radio Frequency Identification (RFID) sensors in a coverage area of an RFID reader system are disclosed. In accordance with embodiments of this invention, the contention resolutions or results of each slot in an interrogation receive frame are determined. The contention resolutions are then used to determine the probabilities of different population estimates. A population estimate is then selected as the population based on the probability of the estimate meeting predetermined criteria.

17 Claims, 8 Drawing Sheets

(56) References Cited

OTHER PUBLICATIONS

Carbunar et al., "Efficient tag detection in RFID systems", J. Parallel Distrib. Comput., vol. 69, 2009, Retrieved from: http://ac.elscdn.com/S0743731508001202/1-s2.0-S0743731508001202-main.pdf?_tid=9d53bd42-f57a-11e3-948300000aacb35e&acdnat=1402939452_22643bf2522455c5723f2dde84d7455f, Retrieved on: Jun. 16, 2014, pp. 180-196.

International Preliminary Report on Patentability for International Application PCT/US2014/023797, Report Issued Sep. 15, 2015, Mailed Sep. 24, 2015, 5 Pgs.

* cited by examiner

USSYSTEMS AND METHODS FOR
ESTIMATION OF A POPULATION OF
PASSIVE RFID SENSORS

CROSS-REFERENCE TO RELATED
APPLICATIONS

The current application claims priority to U.S. Provisional Patent Application No. 61/776,683 entitled "Systems and Methods for Estimation of a Population of Passive RFID Sensors," filed Mar. 11, 2013, the disclosure of which is incorporated herein by reference.

FIELD OF THE INVENTION

This invention relates to the interrogation of Radio Frequency Identification (RFID) sensors in a particular area. More particularly, this invention relates to systems and methods for estimating a number of RFID sensors in an area to be interrogated.

BACKGROUND OF THE INVENTION

RFID sensors are used for many purposes. One of the most common types of RFID sensors is a passive RFID sensor. A passive RFID sensor includes circuitry that stores a particular encoding; a transceiver module that receives an RF signal from a reader; and circuitry that uses the energy from the received RF signal to power circuitry in the sensor that generates and transmits an RF signal that includes the stored encoding. Passive RFID sensors are popular because of the low cost of the sensor and their durability. In particular, passive RFID sensors do not require replaceable or chargeable batteries since they operate on the energy from the received RF signals.

One of the most common uses of passive RFID sensors is inventory control. To track items in a store or warehouse, passive RFID sensors with unique encodings are attached to the items in the store or warehouse. RFID readers are then placed throughout the store or warehouse. Each RFID reader periodically interrogates the RFID sensors within the coverage area of the reader to obtain the unique encodings to identify the items in the area. The interrogation is performed by transmitting an interrogation signal and reading the signals from the RFID sensors that are received by the RFID reader in predetermined time slots of a particular interrogation frame. The process is repeated for several frames until information is received from all of the RFID sensors in the coverage area of the reader.

As items tend to move within the area, it is often difficult to determine whether an RFID reader has captured the information from all of the RFID sensors in its coverage area. Currently, this is often solved by having the RFID reader perform the interrogation for a predetermined number of interrogation frames that assures that a predetermined number of RFID sensors can be interrogated. The predetermined number is often set much higher than the average number of RFID sensors that are commonly in an area to assure information from all of the RFID sensors in the area are received. However, this does not assure that all of the RFID sensors in an area have been identified. Thus, a way of estimating the number of RFID sensors in a particular area is needed to ensure that all of the items in a particular area are identified.

SUMMARY OF THE INVENTION

The above and other problems are solved and an advance in the art is made by systems and methods of estimating a population of passive RFID sensors in accordance with embodiments of this invention. Embodiments of this invention use the determination of contention resolutions in slots of an interrogation response frame to estimate the population of RFID sensors in the area and provide a certain degree of confidence in the population estimate. For purposes of this discussion, a contention resolution is the result of the signals read from a slot in the interrogation frame. The estimate may then be used to determine whether a predetermined amount of RFID sensors in the area have been identified.

In accordance with embodiments of this invention, the system receives signals from the RFID sensors during the allotted time slots in an interrogation frame. A contention resolution is then determined for each of the time slots. The contention resolutions of the time slots are then used to determine a probability state. Probabilities for different estimated populations or numbers of RFID sensors in the area are determined based upon the probability state. One of the estimated populations is selected as the population based on the determined probabilities of the estimated populations.

In accordance with some of these embodiments of the invention, a state machine is traversed using the contention resolutions of the time slots to determine the probability state and the probabilities for each population estimate are calculated based upon the determined probability state.

In accordance with other embodiments of this invention, the determining of the probability state is performed by determining an address in a lookup table based upon the contention resolutions of the time slots. The probability of each estimated population is read from the determined address in the lookup table. In accordance with some of these embodiments, the lookup table is populated by determining a probability for each possible state for the time slots and storing the probabilities of each possible state of each slot at an address in the lookup table corresponding to the particular state of the particular slot.

In accordance with embodiments of this invention, the contention resolution of each of the slots is a singleton response, an empty response, a captured response, or a deleted response. In accordance with these embodiments, a singleton response and a captured response advance the probability state to a next probability state; and the empty response and deleted response cause the probability state to remain in the same probability state.

In accordance with some embodiments of this invention, the system transmits an interrogation signal prior to the response frame. In accordance with further embodiments, an acknowledgement sachet is transmitted to an RFID sensor in response to a proper decoding of the RFID sensor information received from the RFID sensor to prevent transmission by the RFID sensor in subsequent time slots. In accordance with some embodiments, the population is then used to determine whether a predetermined threshold of RFID sensors in the area have been interrogated.

DETAILED DISCLOSURE OF THE INVENTION

RFID System

Figure 1:
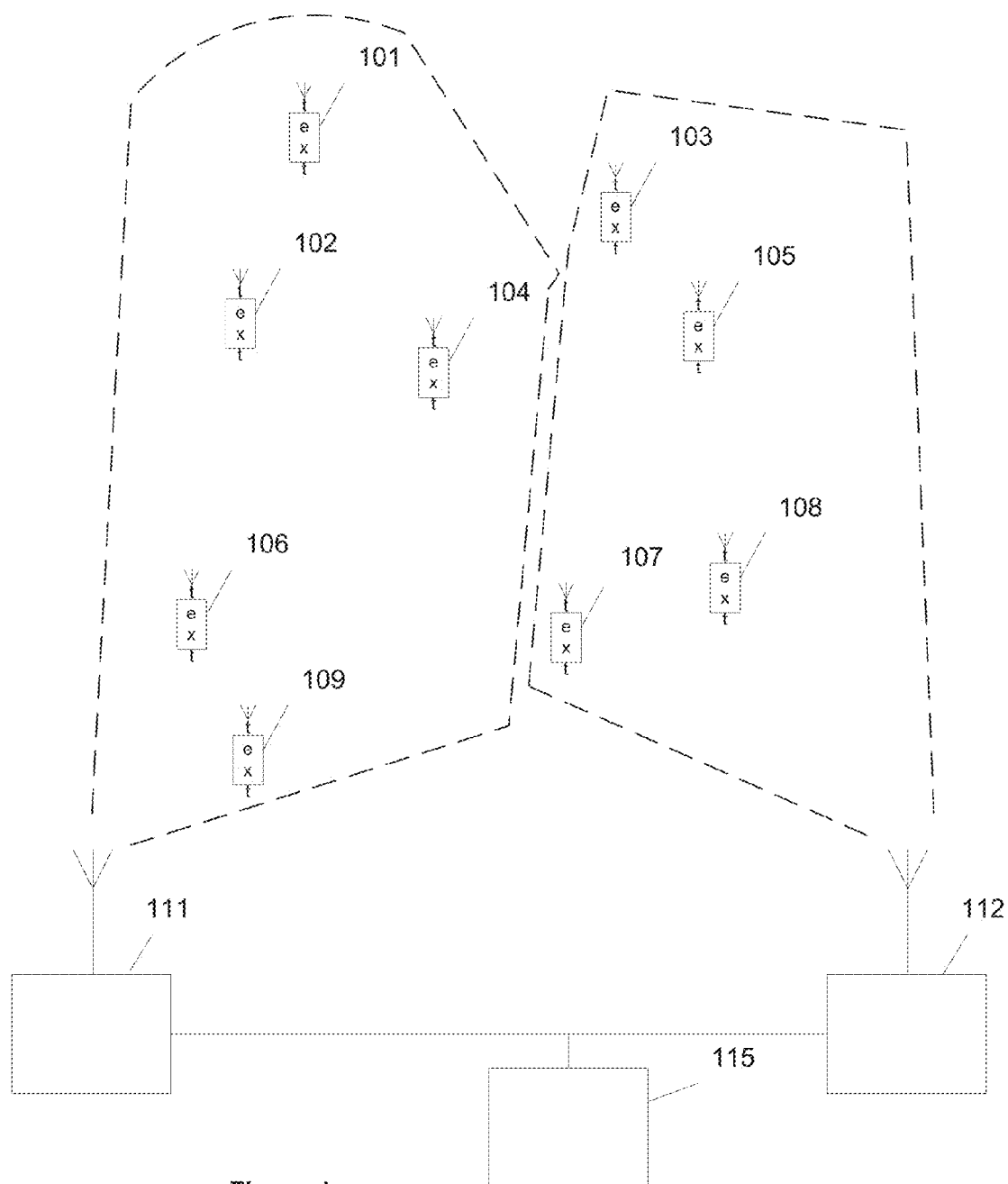
FIG. 1 illustrates a set of RFID passive sensors deployed in an area covered by an RFID reader system having two antennas in accordance with an embodiment of this invention.

Turning now to the drawings, passive RFID sensors 101-109 in an area covered by an RFID reader system in accordance with an embodiment of this invention is illustrated in FIG. 1. The RFID reader includes a controller 115. The controller 115 is a processing system such as a computer system connected to one or more transceivers for communicating with passive RFID sensors to gather data. In the shown embodiment, the controller 115 is connected to two RFID transceivers 111 and 112. RFID transceivers 111 and 112 include the necessary circuitry to transmit and receive RF signals for communication with passive RFID sensors. Each RFID transceiver transmits RF signals that illuminate passive RFID sensors in a particular area of coverage to allow the RFID sensors to generate and transmit response RF signals. One skilled in the art will recognize that the area covered by each RFID transceiver is determined by the energy and frequency of the RF signals that can be transmitted. The energy and frequency of the RF signals is constrained by limits imposed by regulatory bodies; and sensor sensitivity thresholds for harvesting energy and transmitting state information to the reader.

As shown in FIG. 1, RFID reader 111 covers an area that includes RFID sensors 101, 102, 104, 106 and 109. RFID reader 112 covers an area that includes RFID sensors 103, 105, 107, and 108. One skilled in the art will recognize that although two RFID transceivers and nine passive RFID sensors are shown in this embodiment, any number of RFID transceivers and passive RFID sensors may be included in a system without departing from this invention. In order to assure that information from all of the RFID sensors in a coverage area is received during an interrogation process, the RFID reader system needs to ascertain the population of RFID sensors in an area covered by a particular RFID transceiver. Although a system including RFID transceivers is illustrated in FIG. 1, many embodiments of the invention can utilize a distributed exciter architecture similar to the architectures disclosed in U.S. Pat. No. 8,395,482 entitled "RFID Systems Using Distributed Exciter Network", issued Mar. 12, 2013, the disclosure of which is hereby incorporated by reference in its entirety, including one or more RFID receivers and a network of exciters distributed throughout the read range of the RFID receivers to create discrete interrogation zones.

Figure 2:
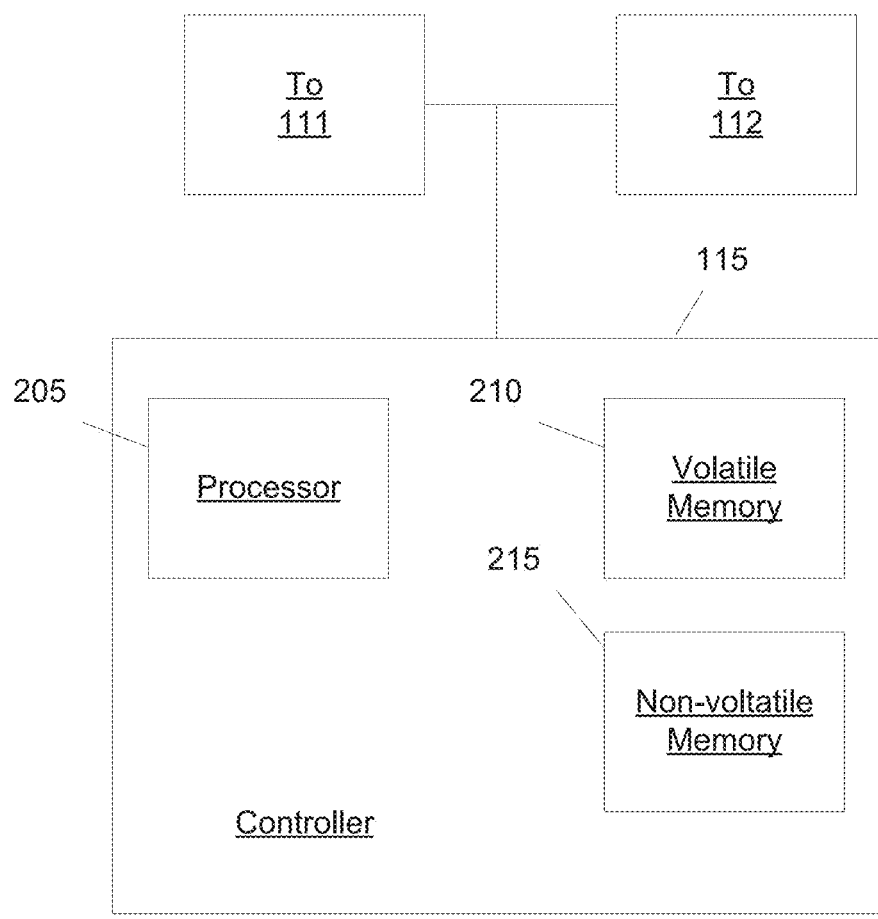
FIG. 2 illustrates an RFID reader system such as the RFID reader system show in FIG. 1 in accordance with an embodiment of this invention.

A more detailed description of the components of controller 115 in accordance with embodiments of this invention is given with reference to FIG. 2. The controller 115 includes a processor 205, a non-volatile memory 215, and a volatile memory 210. The processor 205 is a processor, microprocessor, controller, or a combination of processors, microprocessor, and/or controllers that performs instructions stored in the volatile memory 210 or non-volatile memory 215 to manipulate data stored in the memory. The non-volatile memory 215 and/or volatile memory 210 can store the processor instructions utilized to configure the device 200 to perform processes including processes in accordance with embodiments of the invention and/or data for the processes being utilized. In other embodiments, the software and/or firmware for providing systems and methods in accordance with this invention can be stored in any of a variety of computer readable media in controller 115 that are appropriate to a specific application.

Processor 205 is then connected to RFID transceiver 111 and 112 either directly through an Input/Output (I/O) bus or wireless via transponders connected to the I/O bus. In operation, the processor executes applications that control RFID transceivers to operate at different times to prevent interference between signals and to prevent an RFID sensor from being interrogated by different RFID readers.

Overview of System and Method for Estimating an RFID Population

In order to determine the amount of time that a particular RFID transceiver needs to perform the interrogation process to gather data from all of the RFID sensors in the coverage area of the transceivers, controller 115 ideally would need to know the exact number of passive RFID sensors in the coverage area or alternatively, needs an estimate the population of passive RFID sensors in the coverage area of each of the transceivers that is accurate to within a certain degree of confidence. In an environment where the RFID sensor may move between coverage areas of various transceivers, it is impossible to know the exact number of sensors in the coverage area at any particular time. This is particularly true in an environment, such as a store or warehouse, where there may be 100s or 1000s of RFID sensors moving about the area at any given time. Thus, a system is needed to estimate the population of the passive RFID sensors with a reasonable degree of certainty so that the controller can determine when data has been collected from substantially all of the passive RFID sensors in an area covered by a transceiver. Systems and methods of estimating the population in an area in accordance with embodiments of this invention provide estimates of populations of passive RFID sensors in coverage areas of the RFID reader system that can be used in determining when an RFID receiver has collected data from substantially all of the RFID sensors in the coverage area of the transceiver.

In accordance with many embodiments of this invention, RFID sensor population estimation is based on the following premises. The first premise is that when a population of RFID sensors respond to an interrogation by a RF transceiver the following contention scenarios or results occur in the time slots of an interrogation receive frame of the transceiver:

1. Singleton ($A_s$): a single RFID sensor responds in the slot and information of the sensor is properly decoded;
2. Empty ($A_e$): an empty slot in which no signal from the RFID sensors is received in the slot;
3. Capture ($A_c$): multiple RFID sensors respond in a single slot and data from a single sensor is properly decoded; and
4. Deletion ($A_d$): Multiple sensors respond and data from none of the responding sensors may be decoded.

In the above contention resolutions, the capture and deletion events result from collisions of signals from transmitting RFID sensors in a time slot. The observation of these contention resolutions over a number of slots, L, during an interrogation receive frame may be used to provide an estimate of the number of sensors in the area.

In accordance with embodiments of this invention, the contention resolutions of the time slots in the interrogation receiving frame define a set of integers that represent the value of a state of a slot. Each integer, $X_n$, is determined as follows:

$$X_n = X_{n-1} + \delta_n$$

where $$\delta_n = \begin{cases} 1, & \text{if } Ac \cup As \\ 0, & \text{if } Ae \cup Ad \end{cases};$$

and

Ac~capture event, As~singleton event, Ae~empty slot event, Ad~deletion event.

Let N denote the total number of RFID sensors and L is the number of slots in an interrogation frame. Based on the maximum a posteriori probability (MAP) estimation approach which is optimal in "strict sense" for estimating parameter N, an estimate of N, $\hat{N}$, may be represented in the following manner:

$$\hat{N} = \text{Max}_{N \in \{1, \ldots, N_{max}\}} P_L(N|X_1 \ldots X_L)$$

where $\text{Max}_{N \in \{1, \ldots, N_{max}\}}$ is a maximum value of N that is between 1 and some predetermined maximum value;

$P_L (N|X_1 \ldots X_L)$ is confidence in the probability that N is correct based upon the set of integers representing the slots, $X_1$ through $X_L$. The values of each $X_n$ being the state value of the $X_n$ for each slot based on the contention resolutions observed.

One skilled in the art will note that in a real-world deployment scenario N is typically bounded by an $N_{MAX}$ in a particular area of coverage for an RFID receiver. $N_{max}$ in a passive RFID application is typically in a range of about 1-10 for large assets and may be in a range of 1-1000 for small tagged items, such as pieces of merchandise in a store. Based on Bayes Rule, the estimate of N, $\hat{N}$, can be rewritten as follows:

$$\hat{N} = \max_{N \in [1 \ldots Nmax]} \frac{P_n(X_1 \ldots X_2|N)P_n(N)}{P_n(X_1 \ldots X_2)}$$

where a discrete stochastic process $\{X_n, n=1, \ldots, L\}$ forms a Markov Chain.

Hence, the probability of $X_n$ based on the chain may be rewritten as follows:

$$P_n(X_n|X_1 \ldots X_{n-1}) = P_n(X_n - X_{n-1}).$$

It should be noted that in a general setting that when a RFID sensor responds in a slot and the RFID receiver successfully decodes the data from the sensor, the RFID reader system sends an acknowledgement packet to the RFID sensor to prevent the RFID sensor from transmitting in the remaining time slots of the interrogation receive frame. Thus, the population of active RFID sensors in an area exhibits a time varying behavior from slot to slot depending on the contention resolutions observed in each slot.

Furthermore, each RFID reader system has a different capture capability. Capture capability may be defined as the ability of a RFID reader system to decode the strongest signal received during a slot despite interference that may be cause the transmission of signals from other sensors and/or other environmental factors. The capture capability of a particular RFID reader system is set as a variable threshold denoted as a.

To compute each term for $P_n (X_1 \ldots X_2|N)$, a theoretical graph denoted (G+R) may be used when the only non-zero probability for traversing from one node in state $S_i$ to state $S_j$ are $P_n (S_i \rightarrow S_{i+1})$ and $P_n (S_i \rightarrow S_i)$, i.e. $P_n (S_i \rightarrow S_j) = 0$ except i=j. There is one-to-one isomorphism between each state Strand $X_n$. The probabilities of empty, deletion, singleton and capture contention resolutions for slot n are $P_e^n$, $P_d^n$, $P_s^n$, $P_c^n$ respectively. Hence, the Markov Chain, of Xs can be represented by the state diagram illustrated FIG. 3 in accordance with embodiments of this invention.

Figure 3:
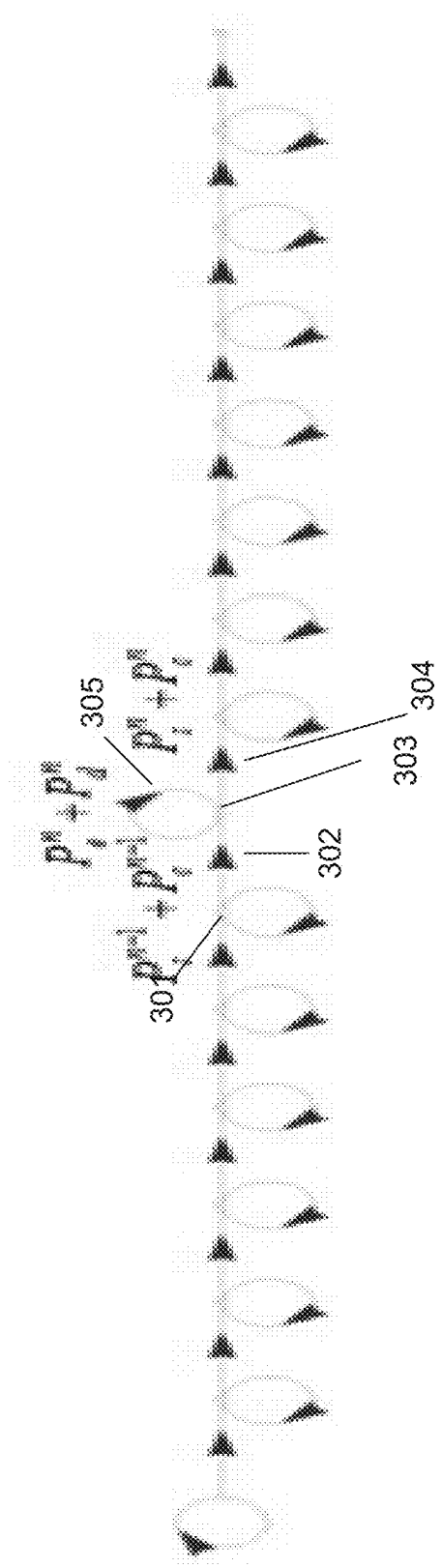
FIG. 3 illustrates a state diagram of probability states based upon the contention resolutions of slots in an interrogation frame in accordance with embodiments of this invention.

In FIG. 3, state change 302 shows $P_n (S_i \rightarrow S_{i+1})$ which is the probability of changing from state 301 to state 303 and state change 305, $P_n (S_i \rightarrow S_i)$, shows the probability of remaining in state 303. State changes 302, 304 and 305 are expanded by $(P_e^n, P_d^n, P_s^n, P_c^n)$ to show the probabilities of these state changes. The probabilities of change to another state, such as state changes 302 and 304, are denoted as $P_n (S_i \rightarrow S_{i+1})$ or $P_n$ and the probability of a state change remaining in the same state are denoted as $P_n (S_i \rightarrow S_i)$ or $Q_n$. One skilled in the art will note that $P_n = P_e^n + P_d^n$ and $Q_n = P_c^n + P_s^n$, or $= 1 - P_n$, With $P_n (X_0 = 0) = 1$.

Figure 4:
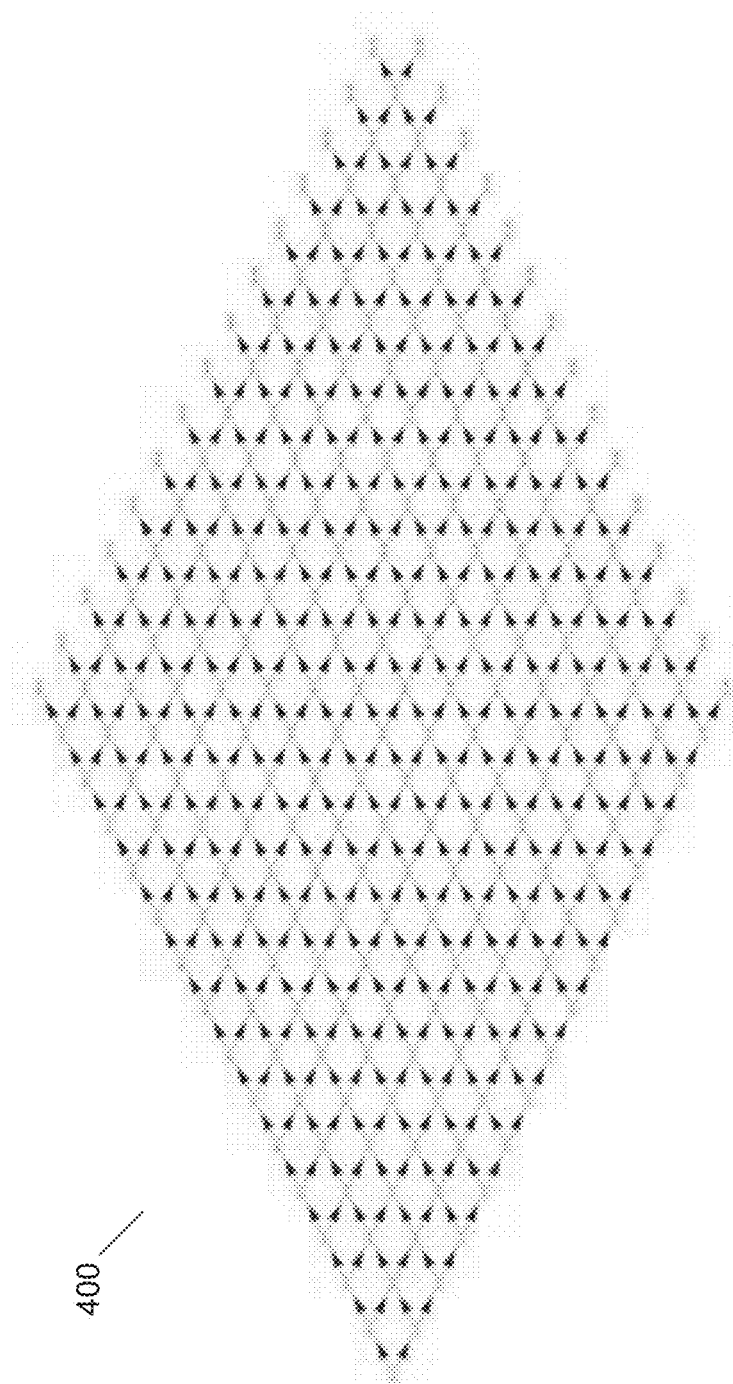
FIG. 4 illustrates a trellis showing the possible probability states for the various slots in an interrogation based on the contention resolutions in accordance with embodiments of this invention.

Based on the state diagram shown in FIG. 3, a trellis 400, illustrated in FIG. 4, generated to show each state that corresponds to a slot i of the interrogation receive frame showing a possible state $S_i^n$ of slot i at times n corresponding to a value of $X_n$ defined in the state diagram shown in FIG. 3. One skilled in the art will note that any probability for a path in the trellis 400 is given by the following equations:

$$Prob(\rho) = \prod_{i=1}^{L} \prod_{j=1}^{L} \delta_{ij}^p \delta_{ij}^q$$

$$\delta_{ij}^p = \begin{cases} p_i & \text{when } j = i+1 \text{ and } X_i = X_{i-1} + 1 \\ 0, & \text{Otherwise} \end{cases}$$

and $$\delta_{ij}^q = \begin{cases} q_i & \text{when } j = i \text{ and } X_i = X_{i-1} \\ 0, & \text{Otherwise} \end{cases}$$

The probabilities of each of the contentions resolutions causing a change in state are then as follows. The probability of an empty contention resolution is:

$$P_e^n = \left(1 - \frac{1}{L}\right)^{N - X_{n-1}};$$

The probability of a singleton contention resolution is:

$$P_s^n = \binom{N - X_{n-1}}{1}\left(\frac{1}{L}\right)\left(1 - \frac{1}{L}\right)^{N - X_{n-1} - 1};$$

The probability of a capture contention resolution is:

$$P_c^n = \sum_{i=2}^{\infty} \binom{N - X_{n-1}}{i} \left(\frac{1}{L}\right)^i \left(1 - \frac{1}{L}\right)^{N-X_{n-1}-i};$$

and
Probability of a deletion contention resolution is:

$$P_d^n = 1 - P_e^n - P_s^n - P_c^n.$$

As stated above, each interrogation response frame has L slots. In each of the L slots in the frame, the RFID reader system can detect one of the four contention resolutions namely Ac, As, Ae, or Ad. Each contention resolution corresponds to a transition for traversing the trellis illustrated FIG. 4. Ac and As represent a state change of $S_i \to S_{i+1}$; and Ae, and Ad represent the state change $S_i \to S_i$. The probability of the state $P_n(S_i)$) is computed by multiplying $P_n(S_{i-1})$ with $Q_n$ and $P_n$ via equations given above.

Figure 5:
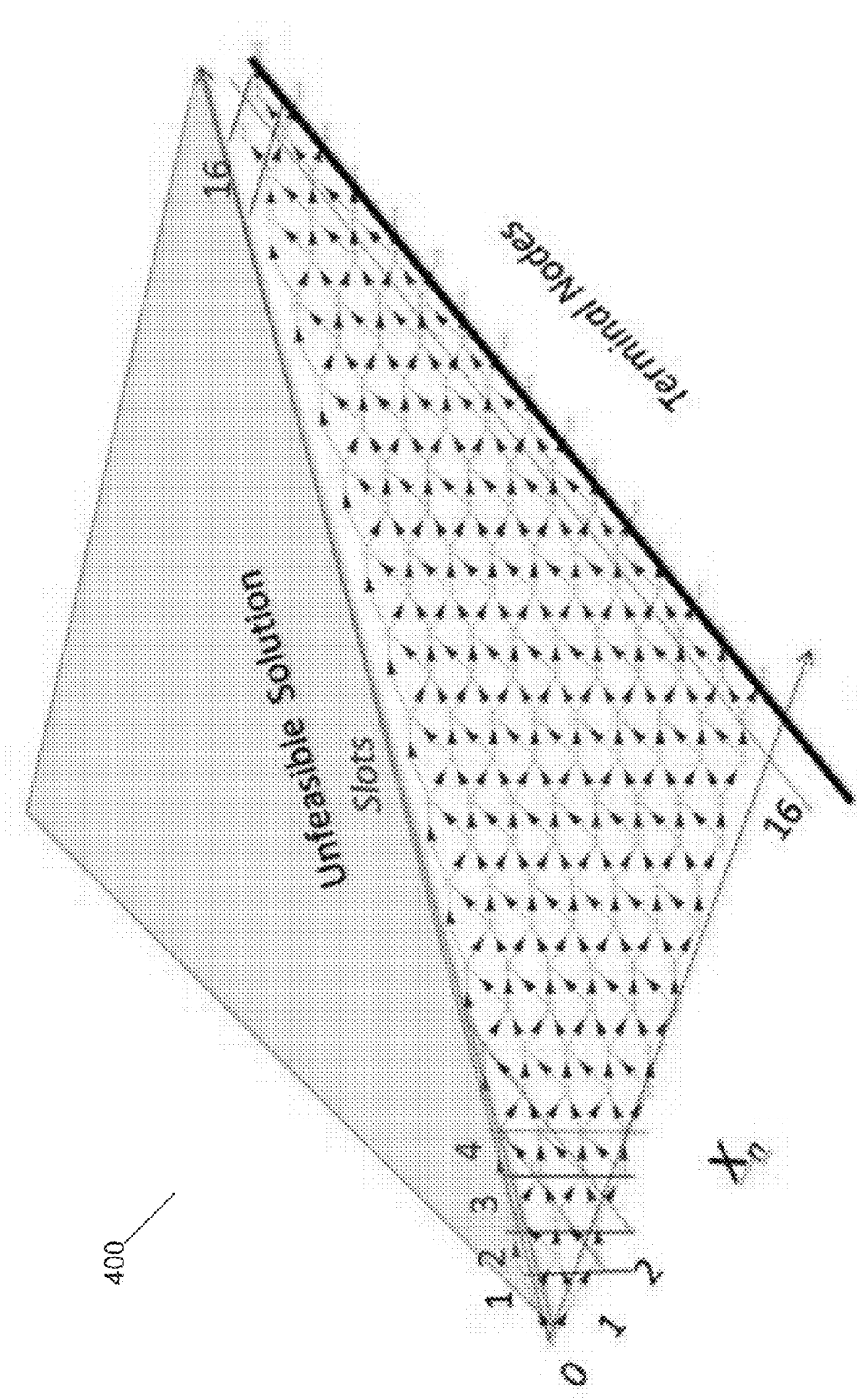
FIG. 5 illustrates a pruned trellis of the possible probability states for slots in an interrogation frame based upon the possible contention resolutions for each slot in accordance with embodiments of this invention.

This operation is repeated for each value of $N \in \{0, \ldots, N_{max}\}$ in the first frame and $N \in \{0, \ldots, \hat{N}_p\}$ where $\hat{N}_p$ denotes the estimate of N from the previous frame. The maximum probability path is then selected. Subsequently, $\hat{N}$ is found in the equation, $$\hat{N} = \max_{N \in [1 \ldots N_{max}]} \frac{P_n(X_1 \ldots X_2 | N) P_n(N)}{P_n(X_1 \ldots X_2)},$$

by imposing an additional constraint of $P_2(N)$ (which may be chosen if one does not assume uniformly probable distribution of N) that may be a typical choice to provide a binomial distribution. This assumes apriori knowledge of mean and variance of distribution of N. For example $\mu = N_{max}$, $\sigma^2 = N_{p(1-p)}$ may be assumed where p can be chosen by the user as desired for the particular use case. Otherwise, one can assume a uniform distribution and simply use the equation $\hat{N} = \text{Max}_n P_n(X_1 \ldots X_2 | N)$ whereby the maximization is taken over the trellis for $\hat{N} = \text{Max}^{-1} P_n(S_L)$. Based on the above, a fully pruned trellis 400 for the case of 16-slots in accordance with embodiments of this invention is shown in FIG. 4. The portion of feasible solutions of the trellis 400 in accordance with embodiments of this invention is shown in FIG. 5. One skilled in the art will note that the upper half portion of a node in the trellis 400 are unfeasible, as shown in FIG. 5, by definition in by the equation:

$$X_n = X_{n-1} + \delta_n$$

where $$\delta_n = \begin{cases} 1, & \text{if } Ac \cup As \\ 0, & \text{if } Ae \cup Ad \end{cases}.$$

Systems for Estimating Population of Passive RFID Sensors

Figure 6:
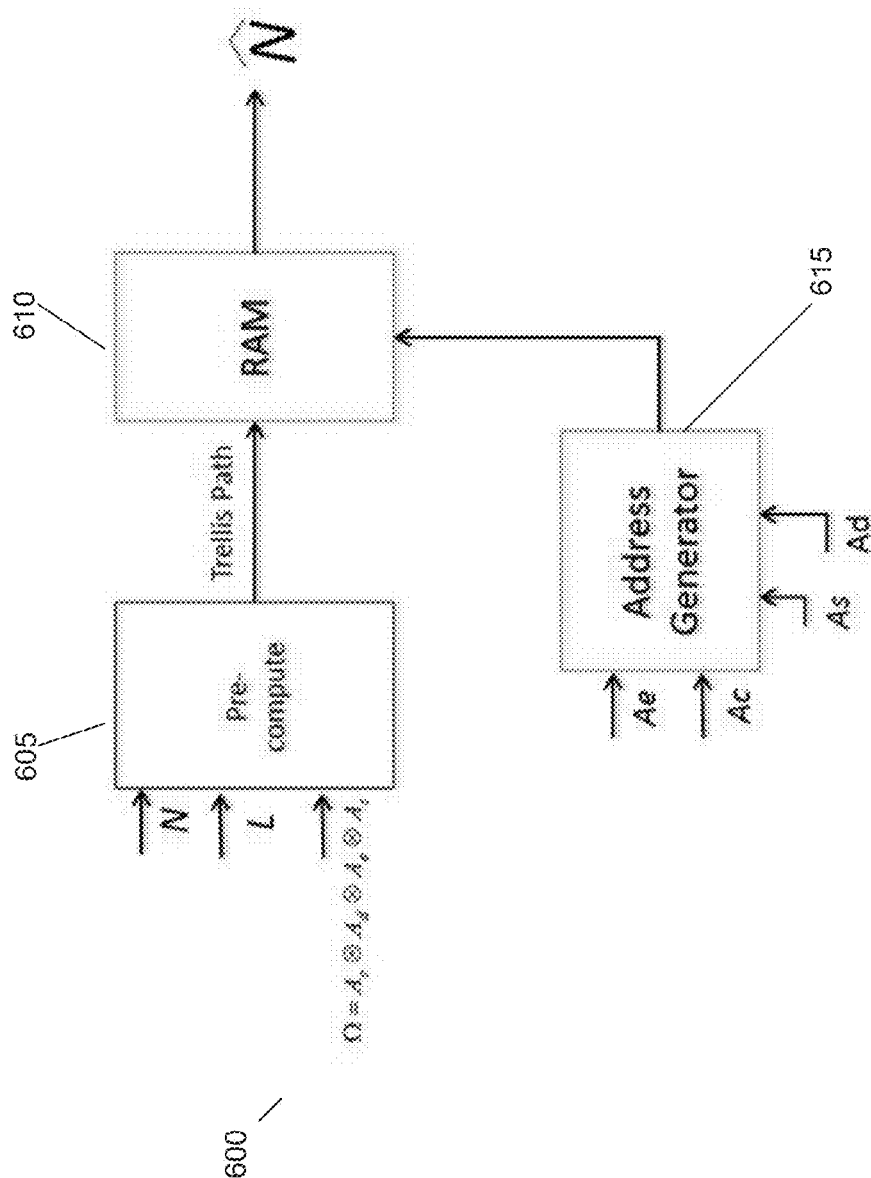
FIG. 6 illustrates a conceptual diagram of a system for estimating the population of passive RFID readers in accordance with an embodiment of this invention.

Based on the above, a first system in accordance with some embodiments of this invention is provided in the following manner. All realizable paths in a trellis of possible nodes based upon the number of slots are pre-computed. The paths of the trellis are then stored in memory. During runtime, a vector including the contention resolutions of the slots ($A_c$, $A_s$, $A_d$, $A_e$) is used by an address generator to output the terminal node of the path corresponding to $\hat{N}$. The probability of $\hat{N}$ may be determined for the node based upon the determined path. A conceptual diagram of a system in accordance with these embodiments is shown in FIG. 6.

System 600 includes module 605 that pre-computes all of the possible paths of a trellis of the nodes for the number of slots, L, in the each interrogation receive frame. These paths are stored in a memory, such as, but not limited to Random Access Memory 610. Address generator 615 then receives the string of contention resolutions observed during the L slots of an interrogation receive frame and uses the contention resolutions to determine the proper address of the node in the trellis for the probability determination for each N from 1 to $N_{max}$ or $\hat{N}$.

Figure 7:
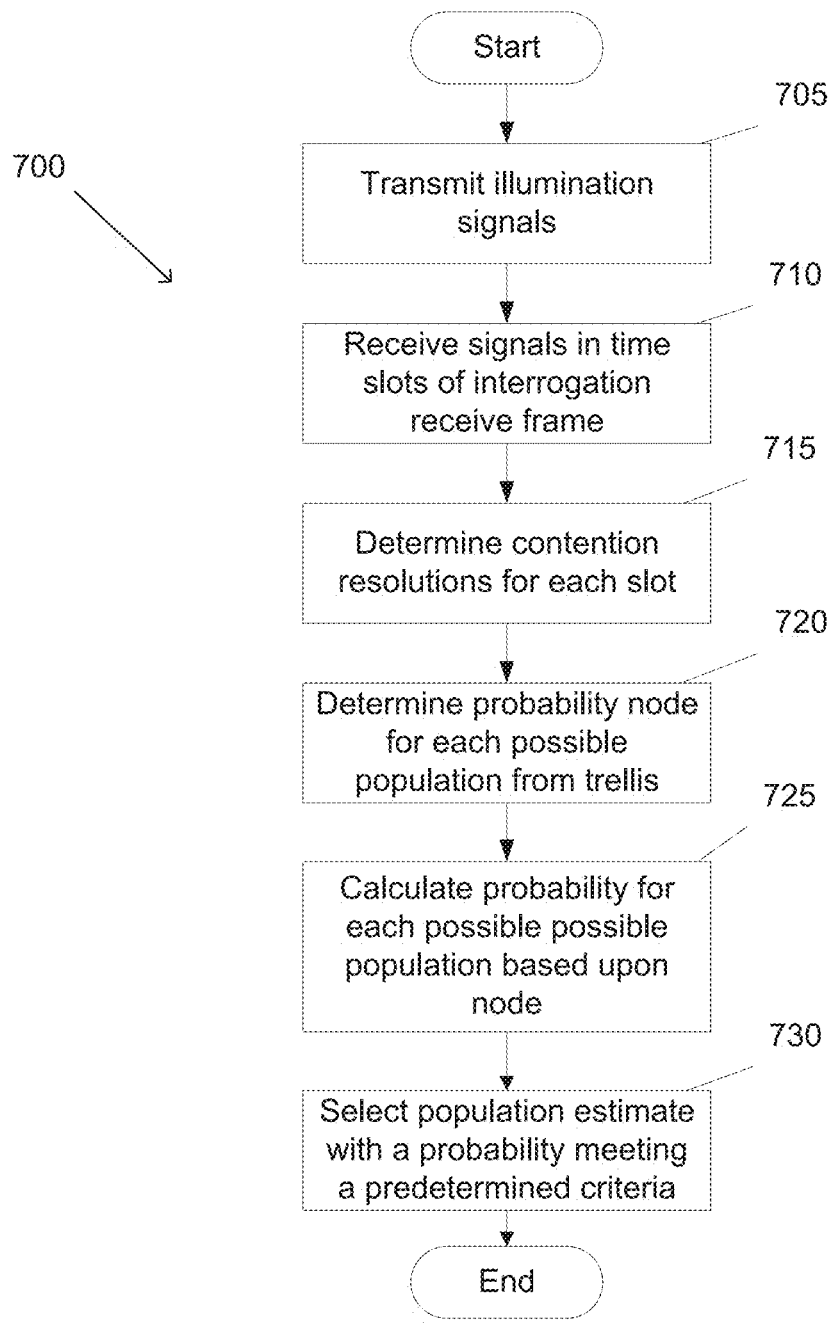
FIG. 7 illustrates a conceptual diagram of an alternative system for estimating the population of passive RFID readers in accordance with an embodiment of this invention.

In accordance with these embodiments, a process performed by a processing system in either the controller or the transceiver based upon instructions stored in the system estimates the population in accordance with the flow diagram illustrated in FIG. 7.

Process 700 includes transmitting an interrogation signal from the RFID reader system to illuminate RFID sensors in the coverage area of the transceiver (705). The RFID reader system then receives RF signals from the RFID sensors during an interrogation receive frame (710). The frame is divided into L time slots. The contention resolution for each time slot is determined from the signals received in each time slot (715). The contention resolutions are then used to determine the probability node for each of the possible population estimates (1 to $N_{max}$ for the first frame or 1 to $\hat{N}$ of the last frame for subsequent frames) (720). Based upon the determined probability nodes for each of the possible population estimates, the probability of each of the population estimates is calculated (730). The population estimate that has a probability that meets a predetermined criterion is then selected as the population of the sensors (735). The predetermined criterion may include any number of parameters including, but not limited to, the population estimate having the highest probability. One skilled in the art will note that the selected population and probability associated with the selected probability may then be used for any number of functions including as criteria in determining when to the interrogation process with a RFID reader system is complete.

Figure 8:
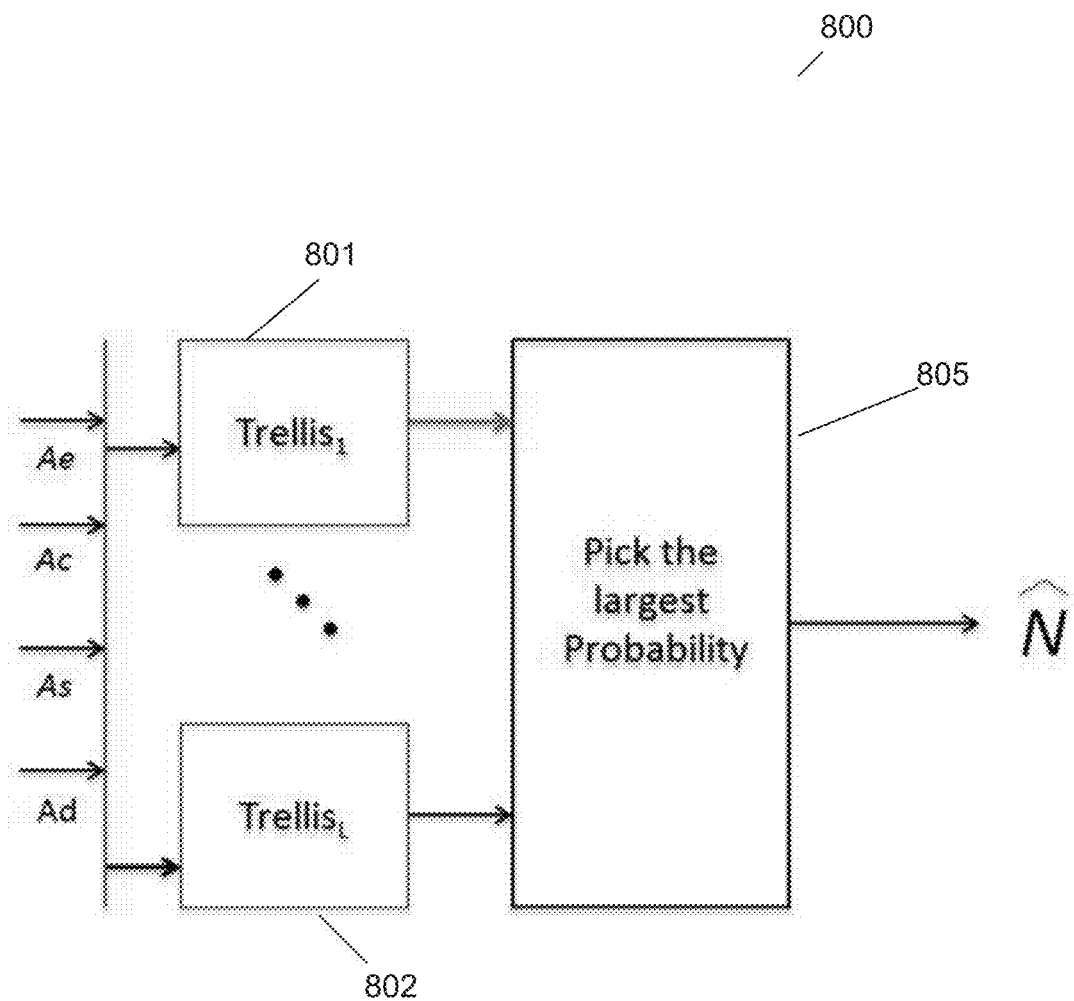
FIG. 8 illustrating a flow diagram of a process for estimating the population of passive RFID sensors in an area in accordance with embodiments of this invention.

As one skilled in the art will appreciate, N may be bounded by a maximum number such as, a thousand tags, and therefore it is feasible to compute the ensemble trellis for all N in the subspace of the sample space of size $L^N$. This approach alleviates the need to compute probabilities for each path in the trellis bank at runtime if computational bandwidth is limited in the reader architecture. A conceptual drawing of a system in accordance with embodiments using this approach is illustrated in FIG. 8. In system 800, a number of trellises 801-802, L, or one trellis for each of the slots in the interrogation frame are stored in a memory. The contention resolutions are then used to traverse each trellis to find the probability of the estimated population. This may be performed by storing the probabilities of each node in each trellis at an address in a lookup table and then using the contention resolutions of the slots in the interrogation frame to determine the proper node and find the address in the lookup table for the node. The probability of the node is then read from the lookup table. The estimated population with the greatest probability is then selected by module 805.

While the above description contains many specific embodiments of the invention, these should not be construed as limitations on the scope of the invention, but rather as an example of embodiments thereof. Accordingly, the scope of the invention should be determined not by the embodiments illustrated, but by the appended claims and their equivalents.

What is claimed is:

1. A method for estimating a population of Radio Frequency Identification (RFID) sensors in an area based upon responses during an interrogation frame processed by a processing system in a transceiver system receiving the responses comprising:

receiving responses from RFID sensors during a plurality of time slots of a receiving frame;

determining a contention resolution of each of the plurality of time slots;

determining a probability state for each of a plurality of population estimates based upon the contention resolution for each of the plurality of time slots;

where the probability state of a population estimate is a confidence in the population estimate based upon the contention resolution observed in the plurality of time slots of a particular receiving frame;

estimating a probability for each of the plurality of population estimates based on the probability state;

selecting one of the plurality of population estimates as a population based upon the estimated probability of the selected one of the plurality of population estimates meeting a predetermined criteria.

2. The method of claim 1 wherein the determining of the probability state comprises:

traversing a state machine using the contention resolutions of the plurality of time slots to determine the probability state wherein the estimating of the probability for each of the plurality probability estimates is calculated based upon the determined state.

3. The method of claim 1 wherein the determining of the probability state is performed by determining an address in a lookup table based upon the contention resolutions of the time slots and the probabilities of each population is read from the determined address in the lookup table.

4. The method of claim 3 further comprising populating the lookup table by determining a probability for each possible state for each of the plurality of slots and storing the probabilities of each possible state for each of the plurality of slots at an address in the lookup table corresponding to a particular state of a slot.

5. The method claim 1 wherein the contention resolution of each of the plurality of slots is selected from one of a singleton response, an empty response, a captured response, and a deleted response wherein a singleton response and a captured response advance the probability state to a next probability state; and the empty response and deleted response cause the probability state to remain in the same state.

6. The method of claim 1 further comprising transmitting an interrogation signal prior to the response frame.

7. The method claim 1 further comprising transmitting an acknowledgement sachet to an RFID sensor in response to a proper decoding of the RFID sensor information from the RFID sensor to prevent transmission in subsequent time slots.

8. The method of claim 1 further comprising determining all the sensors in an area have been interrogated based upon the population estimate.

9. A device for providing an estimate of a population of passive Radio Frequency Identification (RFID) sensors in a coverage area of a RFID reader system comprising:

a memory; and a processor configured via one or more applications stored in the memory to:

receive responses from RFID sensors during a plurality of time slots of a receiving frame, determine a contention resolution of each of the plurality of time slots where the probability state of a population estimate is a confidence in the population estimate based upon the contention resolution observed in the plurality of time slots of a particular receiving frame;

determine a probability state for each of a plurality of population estimates based upon the contention resolutions of the plurality of time slots, estimate a probability for each of the plurality of population estimates based on the probability state for each of the plurality of population estimates, and select one of the plurality of population estimates as a population based upon the estimated probability of the selected one of the plurality of population estimates meeting a predetermined criteria.

10. The device of claim 9 wherein the configuration of the processor to determine the probability state of each of the plurality of population estimates includes configuring the processor to traverse a state machine using the contention resolutions of the plurality of time slots to determine the probability state wherein the estimating of the probabilities for each of the plurality of population estimates is calculated based upon the determined state.

11. The device of claim 9 wherein the configuration of the processor to determine of the probability state is performed by configuring the processor to determine an address in a lookup table based upon the contention resolutions of the time slots and the probabilities of each of the plurality of population estimates is read from the determined address in the lookup table.

12. The device of claim 11 wherein the processor is further configured to populate the lookup table by determining a probability for each possible state for each of the plurality of slots and storing the probabilities of each possible state for each slot at an address in the lookup table corresponding to a particular state of a slot.

13. The device of claim 1 wherein the contention resolution of each of the plurality of slots is selected from one of a singleton response, an empty response, a captured response, and a deleted response wherein a singleton response and a captured response advance the probability state to a next probability state; and the empty response and deleted response cause the probability state to remain in the same state.

14. The device of claim 9 wherein the processor is further configured to direct the RFID reader system to transmit an interrogation signal prior to the response frame.

15. The device of claim 9 wherein the processor is further configured to generate an acknowledgement sachet and direct the RFID reader system to transmit the acknowledgement sachet to an RFID sensor in response to a proper decoding of the RFID sensor information from the RFID sensor to prevent transmission in subsequent time slots.

16. The device of claim 9 wherein the processor is further configured to determine that all the sensors in the coverage area of the RFID reader system have been interrogated based upon the population estimate.

17. A non-transitory machine readable medium containing processor instructions, where execution of the instructions by a processor causes the processor to perform a process for estimating a population of Radio Frequency Identification (RFID) sensors in an area based upon responses during an interrogation frame processed by a processing system in a transceiver system receiving the responses comprising:

receiving responses from RFID sensors during a plurality of time slots of a receiving frame;

determining a contention resolution of each of the plurality of time slots;

determining a probability state for each of a plurality of population estimates based upon the contention resolution for each of the plurality of time slots;

where the probability state of a population estimate is a confidence in the population estimate based upon the contention resolution observed in the plurality of time slots of a particular receiving frame;

estimating a probability for each of the plurality of population estimates based on the probability state;

selecting one of the plurality of population estimates as a population based upon the estimated probability of the selected one of the plurality of population estimates meeting a predetermined criteria.

* * * * *